United States Patent
Bhalla et al.

(10) Patent No.: US 10,871,987 B1
(45) Date of Patent: Dec. 22, 2020

(54) DISTRIBUTED EXECUTION OF TASKS ON CLIENT DEVICES

(71) Applicant: Amazon Technologies, Inc., Seattle, WA (US)

(72) Inventors: Aditya Bhalla, Shoreline, WA (US); Atulya S. Beheray, Sammamish, WA (US); William Alexander Stevenson, Seattle, WA (US); Atul Sharma, Sammamish, WA (US); Cheryl Harris, Seattle, WA (US); Xinning Le, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 15/719,489

(22) Filed: Sep. 28, 2017

(51) Int. Cl.
  *G06F 9/48* (2006.01)
(52) U.S. Cl.
  CPC .................. *G06F 9/4881* (2013.01)
(58) Field of Classification Search
  CPC .................................. G06F 9/4881
  USPC .................................. 718/102, 103
  See application file for complete search history.

(56) References Cited

U.S. PATENT DOCUMENTS

| | | | | |
|---|---|---|---|---|
| 6,112,225 A * | 8/2000 | Kraft | ...... | G06F 9/5072 709/201 |
| 6,971,018 B1 | 11/2005 | Witt | | |
| 6,988,139 B1 * | 1/2006 | Jervis | ...... | G06F 9/5038 709/224 |
| 8,726,278 B1 * | 5/2014 | Shawver | ...... | G06F 9/4881 718/100 |
| 2002/0198923 A1 * | 12/2002 | Hayes, Jr. | ...... | G06F 9/5038 718/102 |
| 2004/0215590 A1 * | 10/2004 | Kroening | ...... | G06F 9/5072 |
| 2005/0149949 A1 * | 7/2005 | Tipton | ...... | H04L 41/082 719/321 |
| 2005/0155077 A1 | 7/2005 | Lawrence | | |
| 2006/0005181 A1 * | 1/2006 | Fellenstein | ...... | G06F 8/61 717/174 |
| 2006/0059492 A1 * | 3/2006 | Fellenstein | ...... | G06F 9/5072 718/104 |
| 2006/0288097 A1 * | 12/2006 | Sorrentino | ...... | G06F 3/1207 709/224 |
| 2007/0028242 A1 * | 2/2007 | Martin | ...... | G06F 9/5027 718/102 |
| 2008/0163219 A1 * | 7/2008 | Marwinski | ...... | G06F 9/4881 718/101 |
| 2010/0299664 A1 * | 11/2010 | Taylor | ...... | G06F 16/2379 717/173 |
| 2012/0254874 A1 * | 10/2012 | Siira | ...... | G06Q 10/06311 718/102 |

(Continued)

OTHER PUBLICATIONS

Berstis, Viktors, "Fundamentals of Grid Computing," 2002, IBM Corp., p. 1-28. (Year: 2002).*

*Primary Examiner* — Qing Chen
(74) *Attorney, Agent, or Firm* — Knobbe, Martens, Olson & Bear, LLP (57) ABSTRACT

A communication system and method for the utilization of a job management system to provide computing devices operational information. The job management system obtains a job definition from a user via a user device. The job management system processes the job definition to create job task workflow to be implemented by one or more identified client devices. The job management system can then monitor the implementation of the job task workflow.

17 Claims, 9 Drawing Sheets

(56) References Cited

U.S. PATENT DOCUMENTS

| | | |
|---|---|---|
| 2013/0007520 A1 | 1/2013 | Giammarresi |
| 2014/0181825 A1* | 6/2014 | He .................. G06F 9/5027 718/102 |
| 2015/0006735 A1* | 1/2015 | Chai ................. G06F 15/00 709/226 |
| 2016/0092250 A1* | 3/2016 | Wagner ............. G06F 9/45558 718/1 |
| 2017/0168777 A1 | 6/2017 | Britt |
| 2017/0323027 A1 | 11/2017 | Nguyen |
| 2018/0324478 A1 | 8/2018 | Das |
| 2018/0302443 A1 | 10/2018 | Weiss |
| 2019/0102220 A1* | 4/2019 | Bishop ............... G06F 9/4881 |

\* cited by examiner

DISTRIBUTED EXECUTION OF TASKS ON CLIENT DEVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present application corresponds to the management of commands transmitted to computing devices in a communication network. More specifically, aspects of the present application correspond to the utilization of a job management system to provide commands or instructions to client devices and exchange information related to the operation of client devices. Illustratively, one or more client devices include network connectivity sufficient to interface with a job management system. Some of the client devices may correspond to devices in which the computing functionality is not the sole function of the device, such as appliances that have embedded computing resources. Additionally, many of these devices do not have traditional input or output controls that facilitate the configuration of the client devices by a user or are otherwise implemented in a manner that facilitates individual configuration of the devices, such as the implementation of updates. Nonetheless, many of the client devices may configured to communicate via a messaging protocol, such as the MQ Telemetry Transport protocol ("MQTT protocol"), to exchange content.

In accordance with aspects of the present application, one or more client devices can be organized as part of a grouping of client devices, such as in a home, business or other logical or physical organizational criteria. To facilitate configuration or the transmission of commands, the client devices communicate with the job management system and receive commands or otherwise interact with the job management system. By way of non-limiting examples, the client devices can obtain application updates, firmware updates, configuration changes or updates, security information for subsequent communications (e.g., certificate configurations), troubleshooting commands, and the like.

Traditionally, a user, such as a system administrator, can individually transmit commands or instructions to specific client devices or sets of devices. For example, a user can transmit information, such as an embedded update, to one or more client devices by publishing the information as topics in accordance with the MQTT protocol and utilizing a messaging broker component. In this example, the one or more clients must be configured in advance to register to receive the information published according to the specific topic. However, the traditional communication methodology for updating or configuring client devices can become deficient because of the individualized nature of the communications. Such approaches require the user to be able to individually address client devices, such as by a series of registered topics. Additionally, such approaches can be deficient in that more complex interactions, such as a series of updates or configurations, must be individually managed by the user.

In accordance with aspects of the present application, to communication commands or configurations the client devices, a user can utilize a user device to access the job management system and specify job definition information. The job definition information can include the specification of the intended end goal or end state of the client device will result from the execution of the job. The user can further specify the organizational criteria or selection criteria utilized by the job management system to identify the set of client devices that are to implement the transmitted content, which will be generally referred to as job definition information. As will be explained in greater detail below, each job can be associated as a set of job tasks implemented by receiving client devices. By specifying the desired job and the selection criteria, the job management system can implement and manage the execution of job as individual tasks assigned to identified client devices.

Once a connection with the specific user or administrator has been established, the job management system processes the job definition information to identify the set of job tasks to be implemented and the set of client devices that will receive individual job tasks for execution. The job management system can then utilize the process job information to generate a job workflow that facilitates the scheduling and prioritization of job tasks for individual client devices. The job management system can receive updates or notifications regarding implementation of job tasks and manage additional job tasks according to the job workflow or generate updates to user device(s). For example, the job management system can provide a current state of execution of assigned tasks based on a submitted job request.

Although aspects of some embodiments described in the disclosure will focus, for the purpose of illustration, on the MQTT messaging protocol, the HTTP network protocol, and other illustrative communication and networking approaches, one skilled in the relevant art will appreciate that the examples are illustrative only and are not necessarily intended to be limiting.

Figure 1:
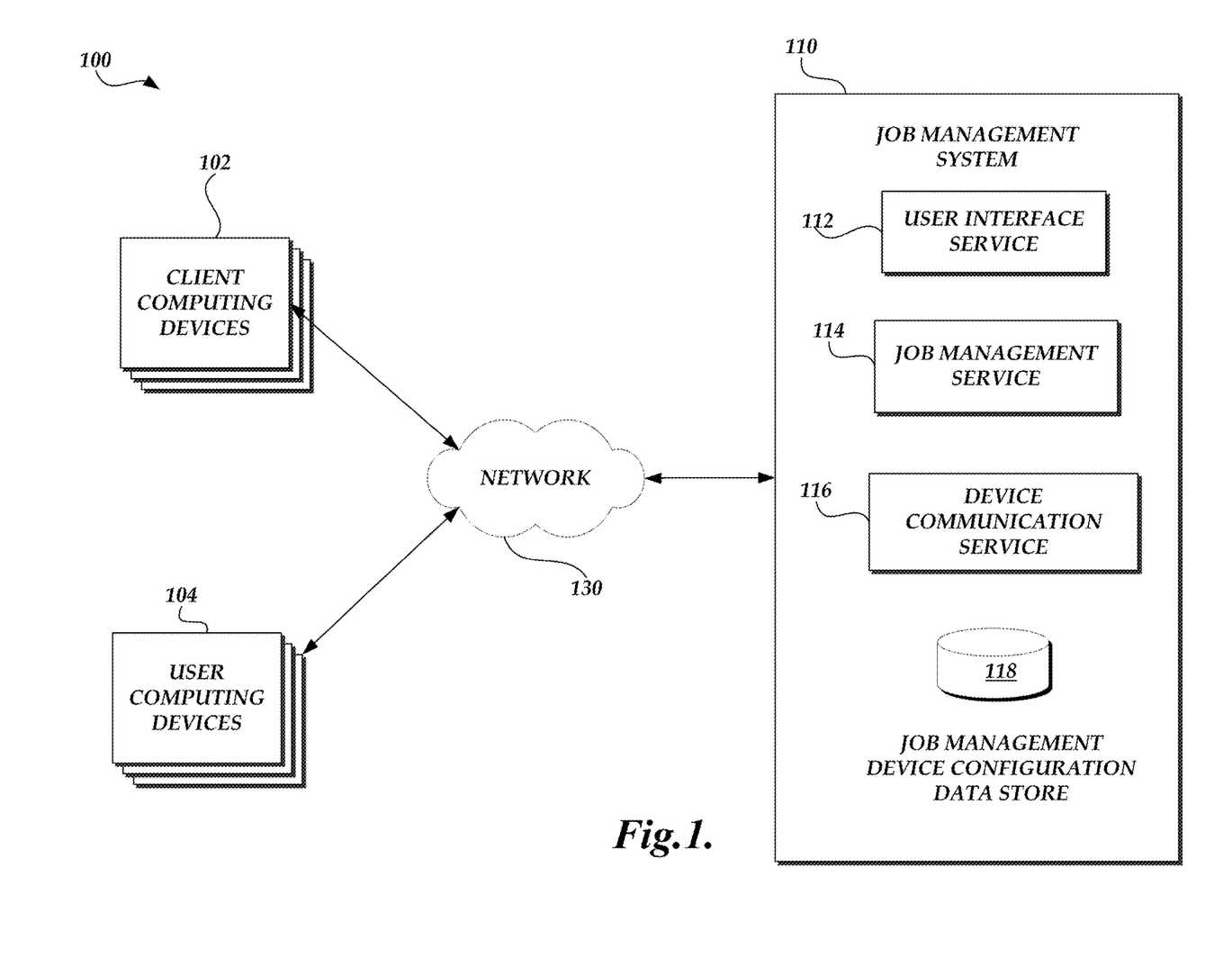
FIG. 1 is a block diagram of a communication management environment that includes one or more client devices, one or more user devices, and a job management system according to one embodiment.

FIG. 1 is a block diagram depicting an illustrative logical network 100 including multiple client computing devices 102 and user devices 104 in communication with a job management system 110 via a network 130. While the client computing devices 102 and user devices 104 are shown as a group within FIG. 1, the client computing devices 102 and user devices 104 individually or as a grouping may be geographically distant, and independently owned or operated. For example, the client computing devices 102 or client devices 102 could represent a multitude of client devices within a specific home or office. In another example, the client computing devices 102 could be part of a grouping of multiple of devices associated with an organization, such as number of computing components associated with various devices in different geographic areas. Similarly, while one set of illustrative components is shown to represent the job management system 110, multiple instances of each component may be present within the job management system 110, and such components may be located within geographically diverse areas (e.g., globally, continentally, or regionally), in order to provide a wide geographical presence for the job management system 110.

Network 130 may be any wired network, wireless network, or combination thereof. In addition, the network 130 may be a personal area network, local area network, wide area network, cable network, satellite network, cellular telephone network, or combination thereof. In the example environment of FIG. 1, network 130 is a global area network (GAN), such as the Internet. Protocols and components for communicating via the other aforementioned types of communication networks are well known to those skilled in the art of computer communications and thus, need not be described in more detail herein. While each of the client computing devices 102, user devices 104, and job management system 110 is depicted as having a single connection to the network 130, individual components of the client computing devices 102, user devices 104, and job management system 110 may be connected to the network 130 at disparate points. Accordingly, communication times and capabilities may vary between the components of FIG. 1.

Client computing devices 102 may include any number of different computing devices capable of communicating with the job management system 110, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, input and output capabilities, etc.) than the user computing devices 104 and job management system 110. Illustrative components of a client computing device 102 will be described with regard to FIGS. 2 and 2A. In one embodiment, the client computing devices 102 can be referred to an Internet of Things ("IOT") devices representative of a class of devices in which computing functionality can be embedded within devices having at least one additional alternative functionality. Examples include, but are not limited, household appliances, controls for various other devices, consumer goods, and the like.

Similar to the client computing devices 102, the user computing devices 104 may include any number of different computing devices capable of communicating with the job management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 104 may optionally include one or more data stores (not shown in FIG. 1) including various applications or computer-executable instructions, such as web browsers, used to implement the embodiments disclosed herein. Illustrative components of a user computing device 104 will be described with regard to FIG. 3. For purposes of illustration, user computing devices 104 are representative of a class of devices having increased available computing resources, including the ability for input and output mechanisms.

In accordance with embodiments, the job management system 110 includes one or more servers for implementing a user interface service 112 for interfacing with user devices 104, a job management service 114 for processing job definition information, a device communication service 116 for facilitating the configuration of client devices 102, and a device configuration data store 118. As described in further detail below, the job management system 110 can receive job definition information from a user device 104 and utilizing network based messaging protocols, such as MQTT, to facilitate communications to the client devices 102. Illustrative components of portions of the job management service 114 will be described with regard to FIG. 4. Illustrative components of portions of the device communication service 116 will be described with regard to FIG. 5. Illustratively, the job management and device configuration data store 118 can maintain information related to the job workflows and client device job tasks implementation status. As will be described below, the job management and device configuration data store 118 can also maintain information that facilitates the selection of job definition information or the submission of job requests by users.

It will be appreciated by those skilled in the art that the job management system 110 may have fewer or greater components than are illustrated in FIG. 1. Thus, the depiction of the content parsing system 110 in FIG. 1 should be taken as illustrative. For example, in some embodiments, components of the job management system 110, such as the messaging service 114, may be executed by one more virtual machines implemented in a hosted computing environment. A hosted computing environment may include one or more rapidly provisioned and released computing resources, which computing resources may include computing, networking or storage devices.

Figure 2:
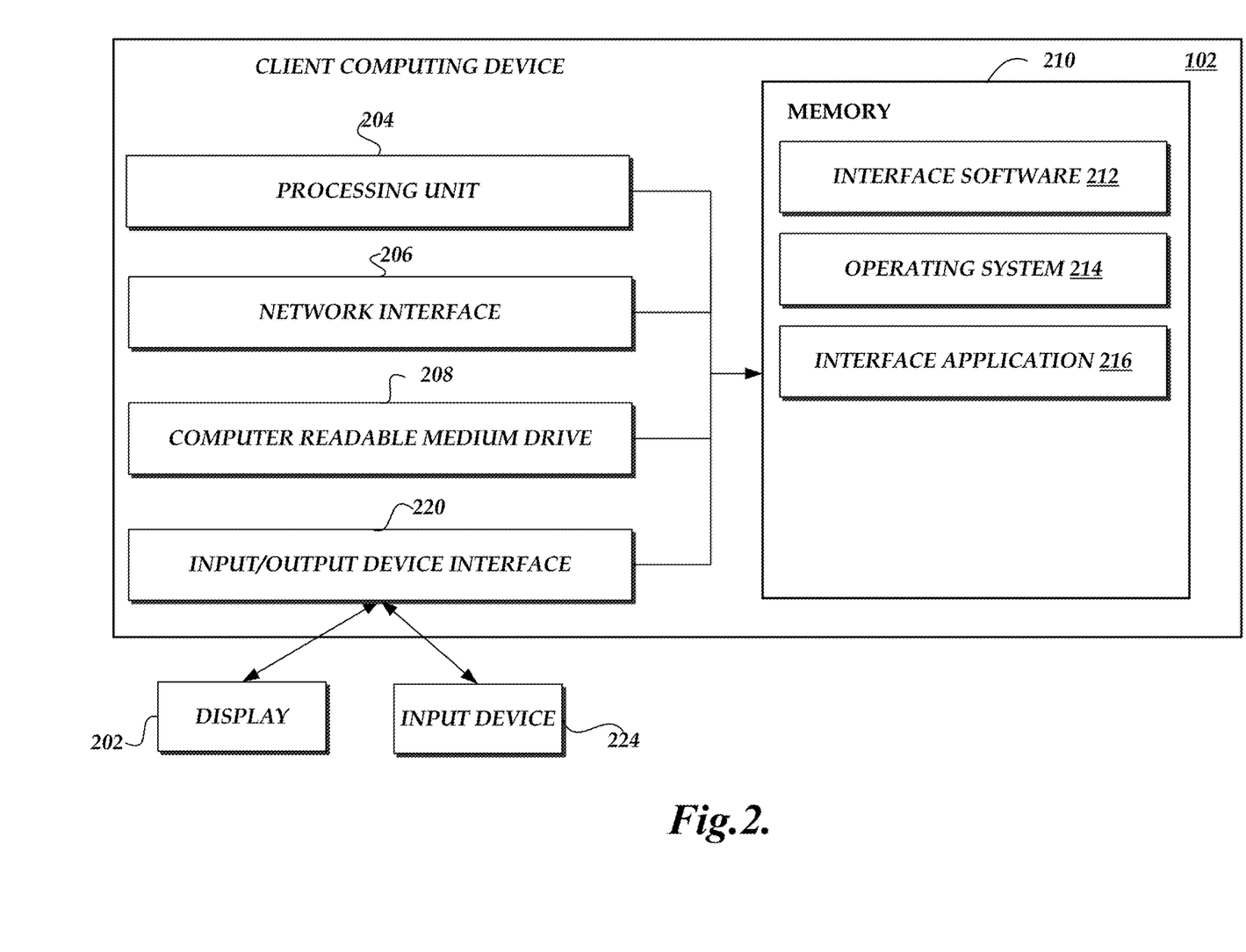
FIGS. 2 and 2A are block diagrams of illustrative components of a limited resource client computing device configured to remotely process content in accordance with an illustrative embodiment.

FIG. 2 depicts one embodiment of an architecture of an illustrative client computing device 102 that can generate and process social network information in accordance with the present application. The general architecture of the client computing device 102 depicted in FIG. 2 includes an arrangement of computer hardware and software components that may be used to implement aspects of the present disclosure. As illustrated, the client device 102 includes a processing unit 204, a network interface 206, a computer readable medium drive 207, an input/output device interface 220, an optional display 202, and an input device 224, all of which may communicate with one another by way of a communication bus. Illustratively, the client computing device 102 may have more limited functionality and components, such as inputs or outputs, as embedded devices.

The network interface 206 may provide connectivity to one or more networks or computing systems, such as the network 130 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the client computing device 102 may omit the display 202 and input device 224, while providing input/output capabilities through one or more alternative communication channel (e.g., via the network interface 206). Additionally, the client device 102 may omit the input and output interface 220 altogether as well.

The memory 210 may include computer program instructions that the processing unit 204 executes in order to implement one or more embodiments. The memory 210 generally includes RAM, ROM or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a browser application 216 for accessing content. Illustratively, the browser application 216 may encompass a full software browser application, portions of a browser application or simply be a software application (or executable instructions) that provide for data connectivity.

Figure 2A:
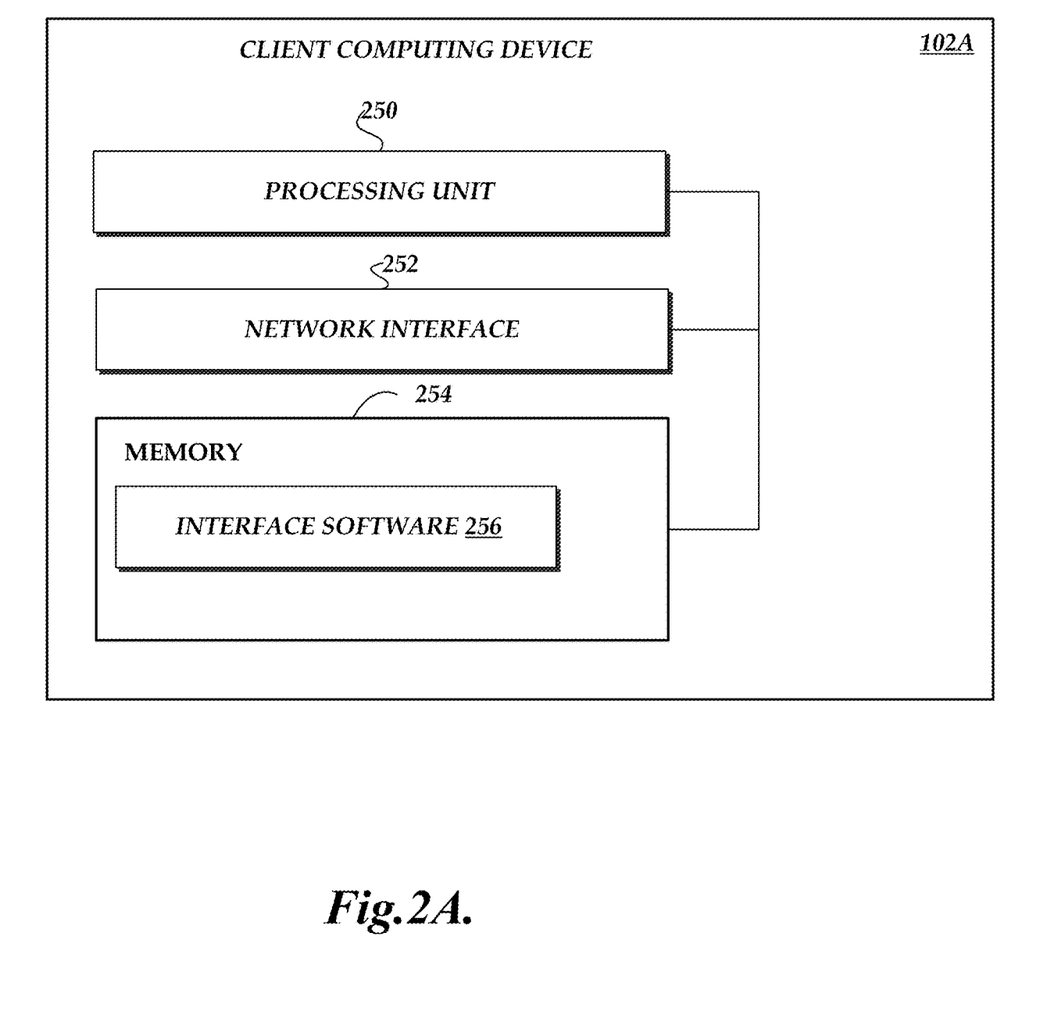

FIG. 2A depicts one embodiment of an alternative architecture of an illustrative client computing device 102A that can generate and process social network information or be utilized in conjunction with the generation and processing of social network information in accordance with the present application. The general architecture of the client computing device 102A depicted in FIG. 2 includes an arrangement of computer hardware and software components that may be used to implement aspects of the present disclosure. However, client computing device 102A may be associated with a reduced of components that may limit the computing functionality and operation of the client device 102A. As illustrated, the client device 102A includes a processing unit 250 and a network interface 252 that communicate with a communication bus. Unlike client device 102 (FIG. 2), the client device 102 may not have a computer readable medium drive, an input/output device interface, an optional display, or an input device.

The network interface 252 may provide connectivity to one or more networks or computing systems, such as the network 130 of FIG. 1. The processing unit 250 may thus receive information and instructions from other computing systems or services via a network. The memory 254 may include computer program instructions that the processing unit 250 executes in order to implement one or more embodiments. The memory 254 generally includes RAM, ROM or other persistent or non-transitory memory. In this embodiment, the memory 254 may store necessarily store a full operating system that provides computer program instructions for use by the processing unit 250 in the general administration and operation of the client 102A. Rather, in one embodiment, the memory 254 includes an interface software component 256 for accessing receiving and processing instructions.

Figure 3:
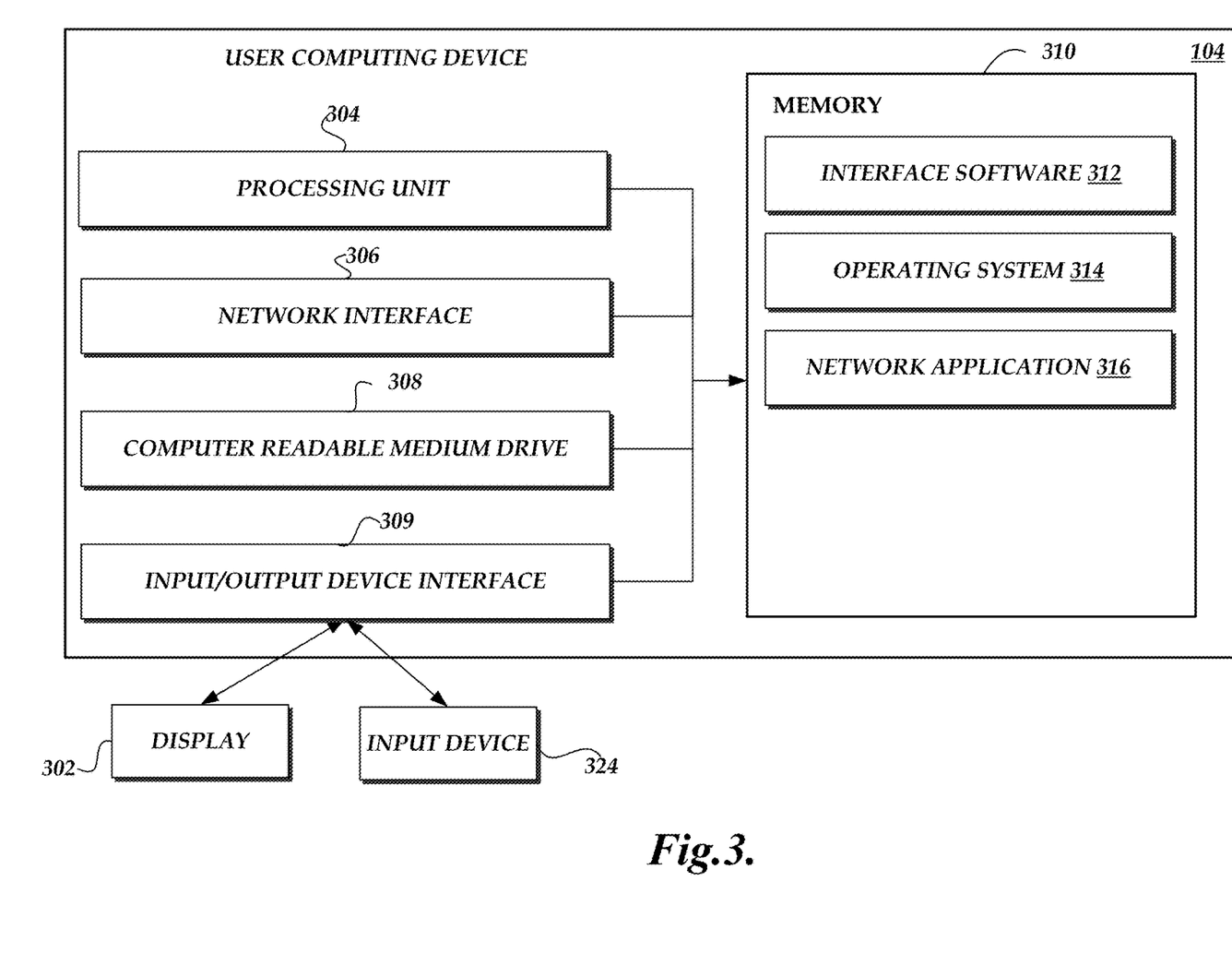
FIG. 3 is a block diagram of illustrative components of a client computing device configured to remotely process content in accordance with an illustrative embodiment.

FIG. 3 depicts one embodiment of an architecture of an illustrative user computing device 104 that can generate and process social network information in accordance with the present application. The general architecture of the user computing device 104 depicted in FIG. 3 includes an arrangement of computer hardware and software components that may be used to implement aspects of the present disclosure. As illustrated, the user computing device 104 includes a processing unit 304, a network interface 306, a computer readable medium drive 307, an input/output device interface 330, an optional display 302, and an input device 224, all of which may communicate with one another by way of a communication bus.

The network interface 306 may provide connectivity to one or more networks or computing systems, such as the network 130 of FIG. 1. The processing unit 304 may thus receive information and instructions from other computing systems or services via a network. The processing unit 304 may also communicate to and from memory 310 and further provide output information for an optional display 302 via the input/output device interface 330. The input/output device interface 330 may also accept input from the optional input device 324, such as a keyboard, mouse, digital pen, etc. In some embodiments, the user computing device 104 may include more (or fewer) components than those shown in FIG. 3.

The memory 310 may include computer program instructions that the processing unit 304 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the user computing device 104. The memory 310 may further include computer program instructions and other information for implementing aspects of the present disclosure. For example, in one embodiment, the memory 310 includes a network application 316, such as browser application, for accessing content and communicating with and processing job definition information with the job management system 110. For example, the network application 316 can include a software application generated on a display 302 that provides templates for selecting job definition information and for transmitting the job definition information via the communication network 130, such as in accordance with the hypertext transfer network protocol ("HTTP").

Figure 4:
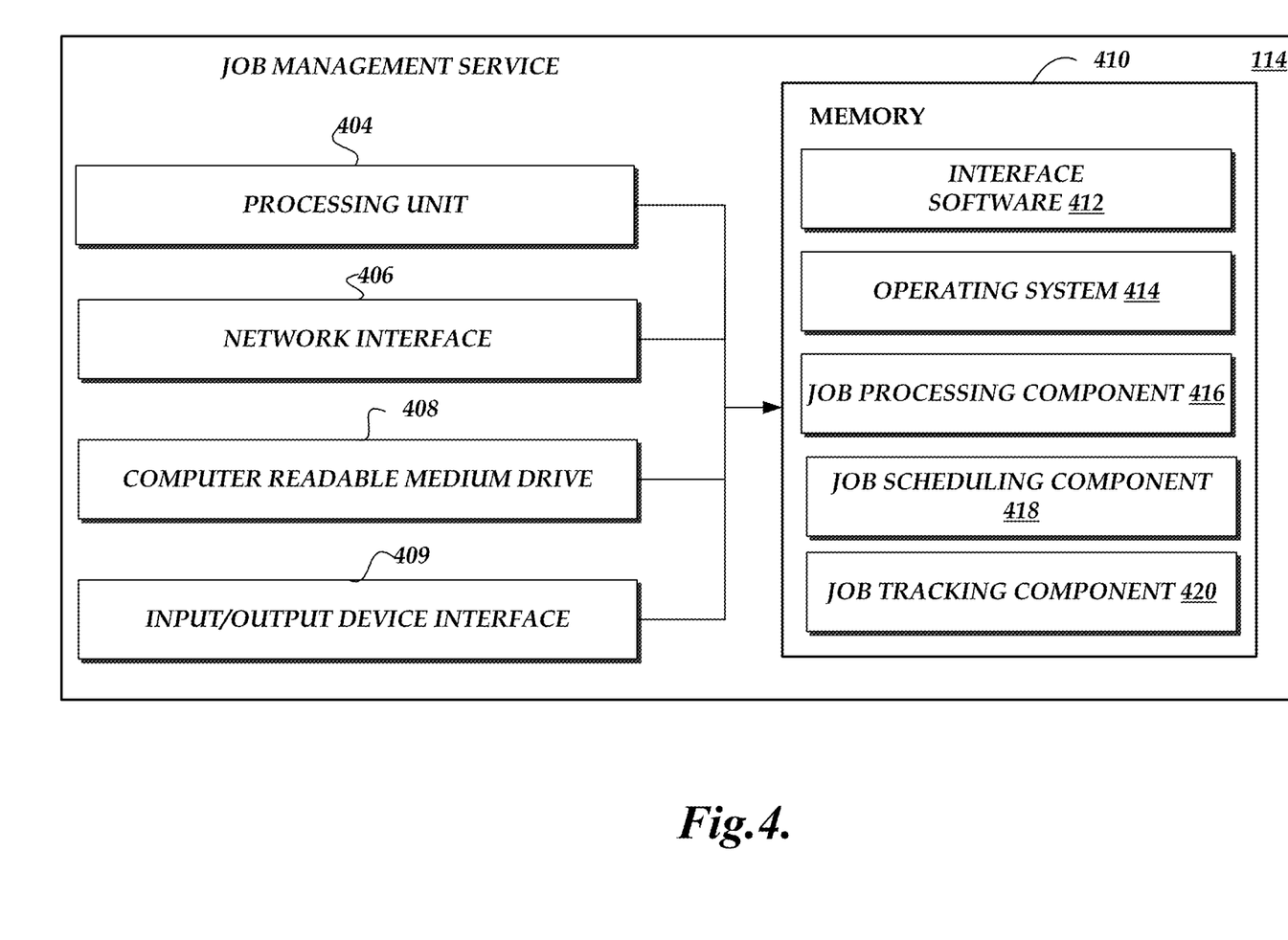
FIG. 4 is a block diagram of illustrative components of a job management service computing device configured to manage jobs for implementation in client devices in accordance with an illustrative embodiment.

FIG. 4 depicts one embodiment of an architecture of an illustrative server for implementing the job management service component 114 described herein. The general architecture of the job management service component 114 depicted in FIG. 4 includes an arrangement of computer hardware and software components that may be used to implement aspects of the present disclosure. As illustrated, the job management service component 114 includes a processing unit 404, a network interface 406, a computer readable medium drive 408, an input/output device interface 409, all of which may communicate with one another by way of a communication bus. The components of the job management service component 114 may be physical hardware components or implemented in a virtualized environment.

The network interface 406 may provide connectivity to one or more networks or computing systems, such as the network 130 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the job management service component 114 may include more (or fewer) components than those shown in FIG. 4.

The memory 410 may include computer program instructions that the processing unit 404 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the messaging services 114. The memory 410 may further include computer program instructions and other information for implementing aspects of the present disclosure. For example, in one embodiment, the memory 410 includes interface software 412 for receiving and processing job requests from user devices 104 via the user interface service 112. As will be described in detail below, the job requests will be in the form of job definition information transmitted from the user device 104 and managed by the job management system 110 to elicit the transmission of job tasks to one or more client devices 102. Additionally, the memory 410 includes a job processing component 416 for processing job definition information submitted from the user devices 104 to assign a set of assignable tasks to a set of selected client devices. Still further, the memory 410 includes a job scheduling component 418 for generating job workflows or otherwise scheduling the execution of tasks by individual client devices 102. The memory 410 can also include a job tracking component 420 for receiving processing information from client devices 102 that have been assigned job tasks and update the job workflow or otherwise keep track of status/state information associated with individual client devices 102.

Figure 5:
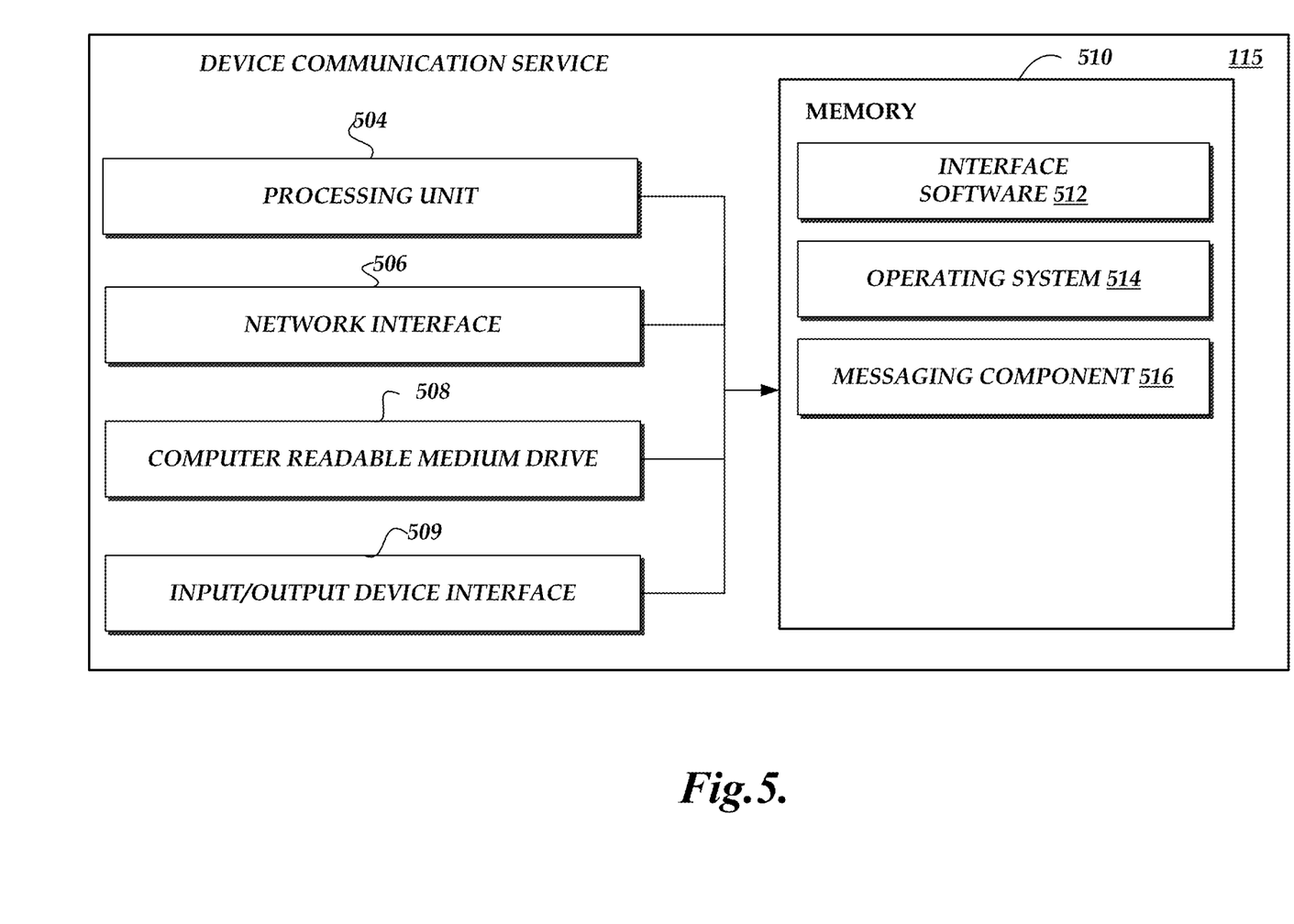
FIG. 5 is a block diagram of illustrative components of a device communication service computing device configured to provide to interface with user devices in accordance with an illustrative embodiment.

FIG. 5 depicts one embodiment of an architecture of an illustrative server for implementing the device interface service component 116 described herein. The general architecture of the device interface service component 116 depicted in FIG. 5 includes an arrangement of computer hardware and software components that may be used to implement aspects of the present disclosure. As illustrated, the device interface service component 116 includes a processing unit 504, a network interface 506, a computer readable medium drive 508, an input/output device interface 509, all of which may communicate with one another by way of a communication bus. The components of the device interface service component 116 may be physical hardware components or implemented in a virtualized environment.

The network interface 506 may provide connectivity to one or more networks or computing systems, such as the network 130 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the device interface service component 116 may include more (or fewer) components than those shown in FIG. 5.

The memory 510 may include computer program instructions that the processing unit 504 executes in order to implement one or more embodiments. The memory 510 generally includes RAM, ROM or other persistent or non-transitory memory. The memory 510 may store an operating system 514 that provides computer program instructions for use by the processing unit 504 in the general administration and operation of the device interface service component 116. The memory 510 may further include computer program instructions and other information for implementing aspects of the present disclosure. For example, in one embodiment, the memory 510 includes client interface software 412 for receiving and processing content requests from user devices 104 via the user interface service 112. Additionally, the memory 510 includes a messaging component 516 for communication job tasks and receiving updates/notifications from the user devices 104. Illustratively, the messaging component 516 can be configured to communicate in accordance with one or more networking protocols, such as the MQTT messaging protocol, HTTP protocol and the like.

Figure 6A:
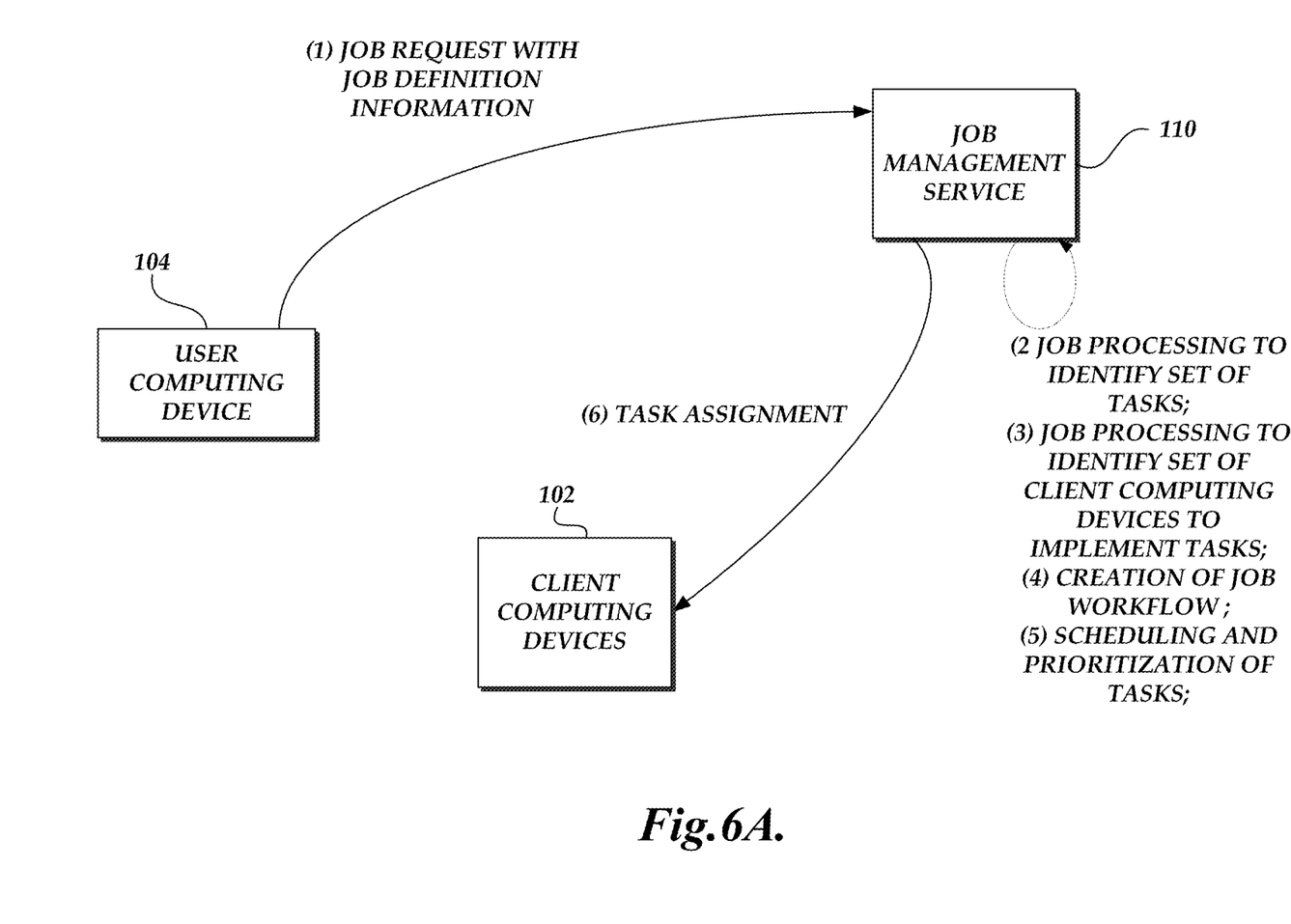
FIG. 6A-6B are block diagrams of the communication management environment of FIG. 1 illustrating the interaction related to client device for obtaining configuration information via social network services in accordance with an illustrative embodiment.
Figure 6B:
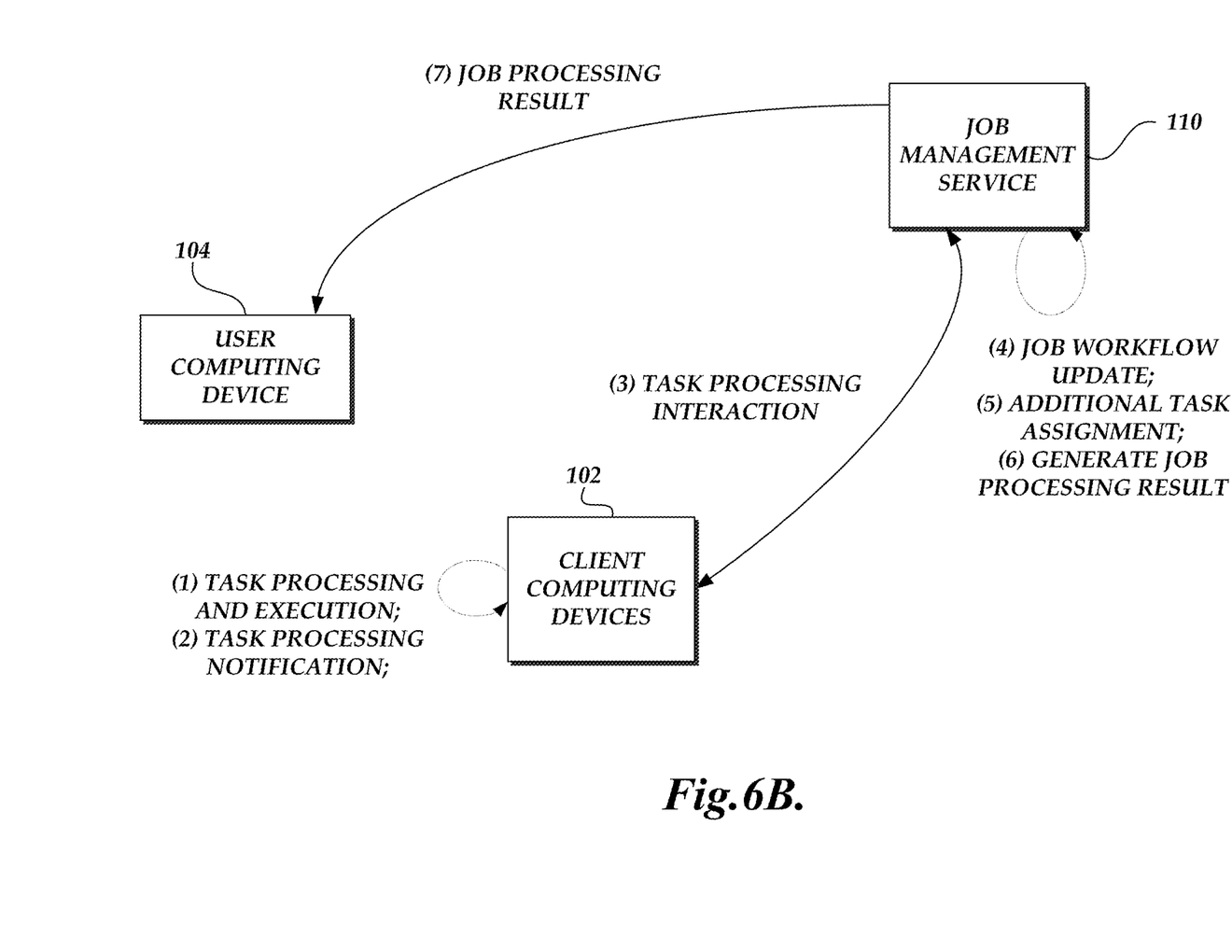

Turning now to FIGS. 6A-6B, illustrative interactions between user devices 104, the job management system 110 and the client devices 102 (either FIG. 2 or FIG. 2A) to configure the client devices will be described. More specifically, FIG. 6A will be described with regard to interactions between a user computing device 104 and the job management system 110 to submit and process job definition information. At (1), the user computing device 104 generates a job request and transmits the job request to the job management system 110. Illustratively, the job request corresponds to job definition information that identifies commands, configurations or other data to be implemented by one or more client devices 102. As described above, the job definition information can include, but is not limited to, application updates, firmware updates, configuration changes, configuration modifications, security information for subsequent communications (e.g., certificate configurations), troubleshooting commands, and the like.

Still further, the job request can include the specification of selection criteria for one or more client devices 102 that will form the set of client devices that will implement at least a portion of the tasks associated with the job description. The selection criteria can be based on organizational information, such as affiliation with an identified organization or geographic information attributed to one or more client devices. The selection criteria can also be based on attributes or characteristics of the client devices, such as specific hardware components, hardware types, software application, software application types, performance information, and the like. The selection criteria may also be based on hierarchical information based on physical attributes or other attributes. For example, if a set of client devices in a particular physical property are associated with hierarchical properties, such as parent devices or managed devices, the specification or identification of the parent device can result in the selection of client devices considered to be children of the specified parent client device.

Illustratively, the job request can be transmitted in accordance with one or more networking protocols, such as an application protocol interface ("API") or via a graphical interface for facilitating data entry. Still further, in some embodiments, the job management system 110 can utilize templates or other structured formats to obtain the job definition information from users. Additionally, in other embodiments, the job management system 110 can pre-populate information from previously submitted job definitions from an organization or user. For example, the job management system 110 can maintain previously submitted job definition information or job template information in the job management and device configuration data store 118 for use in obtaining job definition information from users.

Illustratively, each job task corresponds to individual executable actions or implementable actions by a client device 102. A single job definition may correspond to a single job task. In other embodiments, a job definition may correspond to multiple job tasks. Job tasks may include dependencies, such that execution of a specified task may require successful implementation of a previously specified task or that must be completed prior to (or contemporaneously with) other tasks. The determination of job tasks may be based on instructions or meta-data specified in the job definition or based on other processing information utilized by the job management system 110.

Accordingly, at (2), the job management system 110 selects a set of assignable tasks that will be assigned to individual client devices. In some embodiments, the job definition information will include the identification of the tasks that will be required to implement the defined job. In other embodiments, the job management service 110 will supplement the job definition information to identify the tasks. For example, the job management service 110 can access pre-stored information that has specific assignable tasks that can are to be executed by a selected job or category of job included in the job definition information.

At (3), the job management system 110 processes the job configuration request to identify the set of client computing devices 102 that will implement one or more job tasks. Illustratively, the job management service 110 can evaluate the included selection criteria against information maintained by the job management service 110 to identify the set of client devices. For example, the job management system 110 can maintain a roster of client devices 102 and various attributes of the client devices that can utilized to evaluate the selection criteria. The job management system 110 can also supplement the selection criteria included in the job definition information to facilitate the selection process.

At (4), the job management system 110 creates a job workflow that corresponds to the identification of the job tasks to be implemented and client devices that will be assigned the job tasks. Illustratively, the job management system 110 creates a job workflow that includes at least a subset of the assignable tasks, the assigned client devices, the communication methodology to provide the assignable tasks to the assigned client devices, and a current status of the implementation of assigned tasks. At (5), the job management system 110 utilizes the job workflow to schedule and prioritize the jobs that individual client devices 102 may be implementing. For example, the job management system 110 may receive multiple job definitions from different users. Each job definition may result in job tasks to be implemented by individual client devices 102. Accordingly, in some embodiments, the job management system 110 can prioritize or schedule the grouping of job tasks for implementation by a client device in accordance with multiple job definitions.

At (6), the job management system 110 can transmit the task assignments to the individual client device 102. As discussed above, illustratively, the job management system 110 can leverage networking protocols, such as the MQTT network protocol or HTTP network protocol, that can be leveraged for communication with client devices. In such embodiments, the job management system 110 can utilize additional computing devices or software components, such as messaging brokers, to facilitate the transmission of communication to and from client devices 102.

By way of illustrative example, to facilitate communication in accordance with the MQTT network protocol (or messaging protocol), the client computing device 102 transmits one or more topic registration requests to a messaging broker. Illustratively, the topic registration is defined in accordance with the messaging protocol such that the client computing device 102 can register to receive content published according to specific topics by any number of content providers. At some point after registration, to facilitate communications as described above, the job management system, such as via messaging broker service transmits the published content in accordance with the procedures and capabilities of the messaging protocol, such as MQTT Turning now to FIG. 6B, once the task assignment has been received at the client computing device 102, at (1), the individual client device 102 processes and executes the assigned task. For example, the client device 102 can process instructions to obtain executable code or initiate execution of previously received executable code to implement an update or application configuration. In another example, the client device 102 can receive commands that causer the client device 102 to enter into a trouble shooting mode or to generate information utilized to trouble shoot or test operation of the client device or software application implemented on the client device. At (2), the client device 102 can generate task processing notifications, which are transmitted to the job management system 110. Illustratively, the task processing notifications include indications regarding successful or unsuccessful implementation of the command or information, state information regarding the processing of the task, error logs or other trouble shooting information, and the like. As illustrated in FIG. 6B, the client device 102 and job management system 110 can maintain a bi-directional communication channel to executing task processing information, such as the task processing notifications at (3).

At (4), the job management system 110 updates the job workflow indicative of the task processing notification provided by the client device 102. At (5), the job management system 110 can determine whether additional tasks should be assigned based on the update job workflow. For example, the job management system 110 may have a staged implementation of tasks that will be rolled out to selective sets of client devices 102 based on an indication of a successful implementation by a previous set of devices. Additionally, at (6), the job management system 110 can generate job processing results, which can be transmitted to the user device 104 at (7). Illustratively, the job processing results can include indication of success or failure or includes of job workflow status. For example, the user may be provided with an interface that identifies submitted jobs, the identified set of job tasks, the identified set of assigned client devices and a current state of the implementation of the assigned tasks. The interaction of FIGS. 6A and 6B may be repeated.

Figure 7:
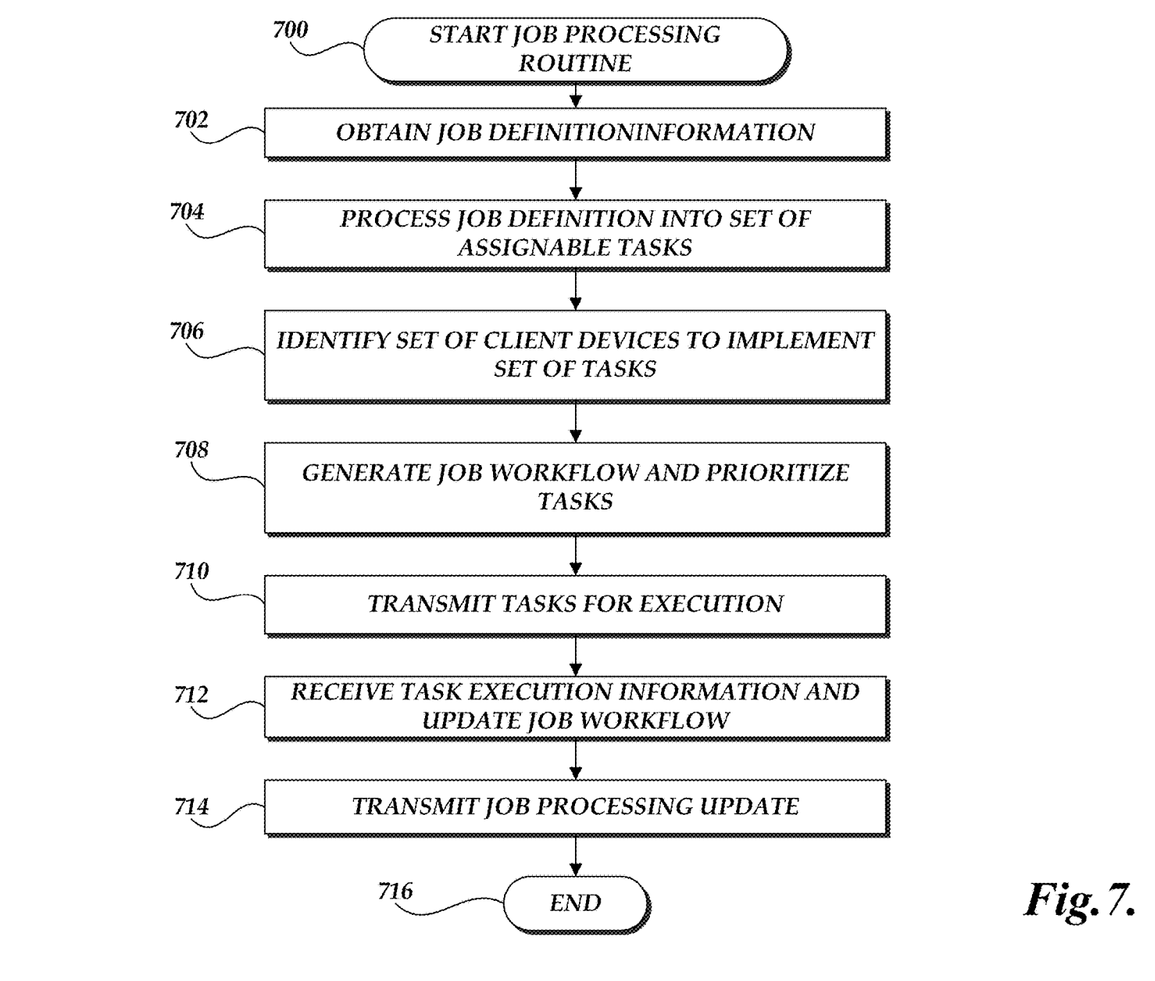
FIG. 7 is a flow diagram illustrative of a job processing routine implemented by a job management system in accordance with an illustrative embodiment.

FIG. 7 is a flow diagram illustrative of a job configuration routine 700 implemented by one or more components of the job management system 110 in accordance with an illustrative embodiment. At block 702, the job management system 110 obtains a job request transmitted by the user devices 104. As described above, the job request corresponds to job definition information that identifies commands, configurations or other data to be implemented by one or more client devices 102. The commands, configurations or other data to be implemented can include, but is not limited to, application updates, firmware updates, configuration modifications, new configurations, security information for subsequent communications (e.g., certificate configurations), troubleshooting commands, and the like.

Still further, the job request can include the specification of selection criteria for one or more client devices 102 that will form the set of client devices that will implement at least a portion of the tasks associated with the job description. The selection criteria can be based on organizational information, such as affiliation with an identified organization or geographic information attributed to one or more client devices. The selection criteria can also be based on attributes or characteristics of the client devices, such as specific hardware components, hardware types, software application, software application types, performance information, and the like. The selection criteria may also be based on hierarchical information based on physical attributes or other attributes.

Illustratively, the job configuration request can be transmitted in accordance with one or more networking protocols, such as an application protocol interface ("API") or via a graphical interface for facilitating data entry. Still further, in some embodiments, the job management system 110 can utilize templates or other structured formats to obtain the job definition information from users. Additionally, in other embodiments, the job management system 110 can pre-populate information from previously submitted job definitions from an organization or user. For example, the job management system 110 can maintain previously submitted job definition information or job template information in the job management and device configuration data store 118 for use in obtaining job definition information from users.

Illustratively, each job task corresponds to individual executable actions or implementable actions by a client device 102. A single job definition may correspond to a single job task. In other embodiments, a job definition may correspond to multiple job tasks. Job tasks may include dependencies, such that execution of a specified task may require successful implementation of a previously specified task or that must be completed prior to (or contemporaneously with) other tasks. The determination of job tasks may be based on instructions or meta-data specified in the job definition or based on other processing information utilized by the job management system 110.

At block 704, the job management system 110 processes the job definition information to identify one or more job tasks to be implemented. As described above, in some embodiments, the job definition information will include the identification of the tasks that will be required to implement the defined job. In other embodiments, the job management service 110 will supplement the job definition information to identify the tasks. For example, the job management service 110 can access pre-stored information that has specific assignable tasks that can are to be executed by a selected job or category of job included in the job definition information.

At block 706, the job management system 110 processes the job configuration request to identify the set of client computing devices 102 that will implement the one or more job tasks. As also described above, the job management service 110 can evaluate the included selection criteria against information maintained by the job management service 110 to identify the set of client devices. For example, the job management system 110 can maintain a roster of client devices 102 and various attributes of the client devices that can utilized to evaluate the selection criteria. The job management system 110 can also supplement the selection criteria included in the job definition information to facilitate the selection process.

At block 708, the job management system 110 creates a job workflow that corresponds to the identification of the job tasks to be implemented and client devices that will be assigned the job tasks. In some embodiments, as part of block 708, the job management system 110 utilizes the job workflow to schedule and prioritize the jobs that individual client devices 102 may be implementing. For example, the job management system 110 may receive multiple job definitions from different users. Each job definition may result in job tasks to be implemented by individual client devices 102. Accordingly, in some embodiments, the job management system 110 can prioritize or schedule the grouping of job tasks for implementation by a client device in accordance with multiple job definitions. One skilled in the relevant art will appreciate that the prioritization of the tasks may be omitted.

At block 710, the job management system 110 can transmit the task assignments to the individual client device 102. As discussed above, illustratively, the job management system 110 can leverage networking protocols, such as the MQTT network protocol, that can be leveraged for communication with client devices. In such embodiments, the job management system 110 can utilize additional computing devices or software components, such as messaging brokers, to facilitate the transmission of communication to and from client devices 102.

Illustratively, the individual client device 102 processes and executes the assigned task. For example, the client device 102 can process instructions to obtain executable code or initiate execution of previously received executable code to implement an update or application configuration. In another example, the client device 102 can receive commands that causer the client device 102 to enter into a trouble shooting mode or to generate information utilized to trouble shoot or test operation of the client device or software application implemented on the client device. The client device 102 can generate task processing notifications, which are received by the job management system 110 at block 712. Illustratively, the task processing notifications include indications regarding successful or unsuccessful implementation of the command or information, state information regarding the processing of the task, error logs or other trouble shooting information, and the like. Additionally, the job management system 110 can further update the job workflow indicative of the task processing notification provided by the client device 102. For example, the job management system 110 can determine whether additional tasks should be assigned based on the update job workflow. In another example, the job management system 110 may have a staged implementation of tasks that will be rolled out to selective sets of client devices 102 based on an indication of a successful implementation by a previous set of devices.

At block 714, the job management system 110 updates the job workflow indicative of the task processing notification provided by the client device 102. Illustratively, the job management system 110 can determine whether additional tasks should be assigned based on the update job workflow. For example, the job management system 110 may have a staged implementation of tasks that will be rolled out to selective sets of client devices 102 based on an indication of a successful implementation by a previous set of devices. Additionally, the job management system 110 can generate job processing results, which can be transmitted to the user device 104 at block 714. Illustratively, the job processing results can include indication of success or failure of a job implementation, job workflow status and individual client device status information. Routine 700 terminates at block 716.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing a distributed transmission of information for execution on client devices utilizing a communication network comprising:

one or more computing devices configured to receive, from user devices, job definition information corresponding to a job to be executed separately by individual client devices of a set of client devices, wherein the job definition information specifies at least job task information that is evaluated to identify a set of job tasks to be executed by the individual client devices of the set of client devices in order to complete the job, and specifies selection criteria that is evaluated to determine the set of client devices to each individually execute the identified set of job tasks, and defines an intended attribute of the individual client devices of the set of client devices that will result from the execution of the job;

one or more computing devices associated with a job management service, wherein the job management service is configured to:
  identify a set of job tasks by evaluating the job task information, wherein the identified set of job tasks to be executed on the individual client devices of the set of client devices is based on processing the job definition information;
  evaluate the selection criteria to determine the set of client devices to each individually execute the identified set of job tasks; and
  generate a job workflow corresponding to a scheduling of individual execution of the identified set of job tasks by the individual client devices of the set of client devices such that each individual client device of the set of client devices executes the job; and one or more computing devices associated with a device communication service, wherein the device communication service is configured to:
  transmit, to the individual client devices of the set of client devices via a messaging broker, job task assignment information based on the job workflow, wherein the job task assignment information causes the individual client devices of the set of client devices to execute the identified set of job tasks; and
  receive, from the individual client devices of the set of client devices via the messaging broker, job task processing notifications associated with the execution of the identified set of job tasks by the individual client devices of the set of client devices.

2. The system of claim 1, wherein the job management service is further configured to prioritize the identified set of job tasks to be executed by at least one client device of the set of client devices.

3. The system of claim 1, wherein the job management service is further configured to update the job workflow based on a notification regarding an assigned job task.

4. The system of claim 1, wherein the set of client devices and the job management service communicate via MQ Telemetry Transport protocol.

5. A computer-implemented method for managing a distributed transmission of information for execution on client devices utilizing a communication network comprising:
 receiving, from user devices, job definition information corresponding to a job to be executed separately by individual client devices of a set of client devices, wherein the job definition information specifies at least job task information that is evaluated to identify a set of job tasks to be executed by the individual client devices of the set of client devices in order to complete the job, and specifies selection criteria that is evaluated to determine the set of client devices to each individually execute the identified set of job tasks, and defines an intended attribute of the individual client devices of the set of client devices that will result from the execution of the job;
 identifying a set of job tasks by evaluating the job task information, wherein the identified set of job tasks to be executed on the individual client devices of the set of client devices is based on processing the job definition information;
 evaluating the selection criteria to determine the set of client devices to each individually execute the identified set of job tasks;
 generating a job workflow corresponding to a scheduling of individual execution of the identified set of job tasks by the individual client devices of the set of client devices such that each individual client device of the set of client devices executes the job;
 transmitting, to the individual client devices of the set of client devices via a messaging broker, job task assignment information based on the job workflow, wherein the job task assignment information causes the individual client devices of the set of client devices to execute the identified set of job tasks; and
 receiving, from the individual client devices of the set of client devices via the messaging broker, job task processing notifications associated with the execution of the identified set of job tasks by the individual client devices of the set of client devices.

6. The computer-implemented method of claim 5, wherein transmitting the job task assignment information to the individual client devices of the set of client devices includes transmitting a message in accordance with MQ Telemetry Transport protocol.

7. The computer-implemented method of claim 5, wherein the job definition information further includes a specification of at least a portion of the job definition information based on a template.

8. The computer-implemented method of claim 5, wherein the selection criteria to determine the set of client devices to each individually execute the identified set of job tasks includes organizational information.

9. The computer-implemented method of claim 5, wherein the selection criteria to determine the set of client devices to each individually execute the identified set of job tasks includes geographic information.

10. The computer-implemented method of claim 5, wherein the job workflow corresponds to a prioritized set of job tasks to be executed by the individual client devices of the set of client devices.

11. The computer-implemented method of claim 10, wherein the prioritized set of job tasks is based on dependency information associated with a series of job tasks.

12. The computer-implemented method of claim 11, wherein the identified set of job tasks include at least one of application updates, firmware updates, or security information for subsequent communications.

13. The computer-implemented method of claim 5, wherein transmitting the job task assignment information to the individual client devices of the set of client devices includes transmitting job task assignments for only a first subset of individual client devices of the set of client devices.

14. The computer-implemented method of claim 13, further comprising transmitting the job task assignment information to a second subset of individual client devices of the set of client devices based on receipt of a notification from the first subset of individual client devices of the set of client devices.

15. A computer-implemented method for managing a distributed transmission of information for execution on client devices utilizing a communication network comprising:
 receiving, from user devices, job definition information corresponding to a job to be executed separately by individual client devices of a set of client devices, wherein the job definition information includes job task information that is processed to determine a set of job tasks and a set of client devices to individually execute the set of job tasks in order to complete the job, and includes selection criteria that is processed to determine the set of client devices to each individually execute the determined set of job tasks, and defines an intended attribute of the individual client devices of the set of client devices that will result from the execution of the job;
 identifying a set of job tasks to be executed on the individual client devices of the set of client devices based on processing the job definition information;
 processing the selection criteria to determine the set of client devices to each individually execute the identified set of job tasks;
 generating a job workflow to be implemented on each individual client device of the set of client devices based on processing the job definition information such that each individual client device of the set of client devices executes the job;
 transmitting, to the individual client devices of the set of client devices via a messaging broker, job task assignment information based on the job workflow, wherein the job task assignment information causes the individual client devices of the set of client devices to execute the identified set of job tasks; and
 receiving, from the individual client devices of the set of client devices via the messaging broker, job task processing notifications associated with the execution of the identified set of job tasks by the individual client devices of the set of client devices.

16. The computer-implemented method of claim 15, further comprising updating the job workflow based on job task completion.

17. The computer-implemented method of claim 15, further comprising generating a notification responsive to the receipt of the job definition information from the user devices.

* * * * *